US006430694B1

United States Patent
Hosein et al.

(10) Patent No.: US 6,430,694 B1
(45) Date of Patent: Aug. 6, 2002

(54) METHOD AND APPARATUS FOR SYNCHRONIZING THE PROVISION OF DATA AMONG GEOGRAPHICALLY DISTRIBUTED DATABASES

(75) Inventors: Patrick A. Hosein, Holmdel; Ronald A. Skoog, Shrewsbury, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/295,923

(22) Filed: Apr. 21, 1999

Related U.S. Application Data

(60) Provisional application No. 60/114,566, filed on Dec. 31, 1998.

(51) Int. Cl.$^7$ .................................................. G06F 1/12
(52) U.S. Cl. ........................ 713/400; 709/400; 710/61; 710/65
(58) Field of Search ........................... 713/400; 712/22; 709/201, 203, 218, 232, 200, 400; 710/61, 54, 56, 58, 59, 60, 65

(56) References Cited

U.S. PATENT DOCUMENTS

| 4,432,057 A | * | 2/1984 | Daniell et al. | 364/300 |
|---|---|---|---|---|
| 4,562,539 A | * | 12/1985 | Vince | 364/200 |
| 5,048,004 A | * | 9/1991 | Deguchi et al. | 369/54 |
| 5,280,602 A | * | 1/1994 | Holt | 395/425 |
| 5,321,832 A | * | 6/1994 | Tanaka et al. | 395/600 |
| 5,455,924 A | * | 10/1995 | Shenoy et al. | 711/118 |
| 5,479,481 A | * | 12/1995 | Koivunen | 379/59 |
| 5,638,360 A | * | 6/1997 | Sugawara | 370/253 |
| 5,784,588 A | * | 7/1998 | Leung | 712/216 |

* cited by examiner

*Primary Examiner*—Jeffrey Gaffin
*Assistant Examiner*—RiJue Mai
(74) *Attorney, Agent, or Firm*—Kenyon & Kenyon

(57) ABSTRACT

A method and apparatus for synchronizing the process of updating a plurality of distributed databases is disclosed. In accordance with an embodiment of the present invention, known database management software executed by a general purpose computer connected to each of the plurality of distributed databases is modified to include the ability to limit the number of data updates which may be outstanding to the plurality of distributed databases during any particular period of time. The modified database management software monitors the number of data updates which have been sent to each of the plurality of distributed databases and only sends additional data updates to each of the plurality of distributed databases if the number of outstanding updates is less than a predetermined maximum number of outstanding data updates.

4 Claims, 2 Drawing Sheets

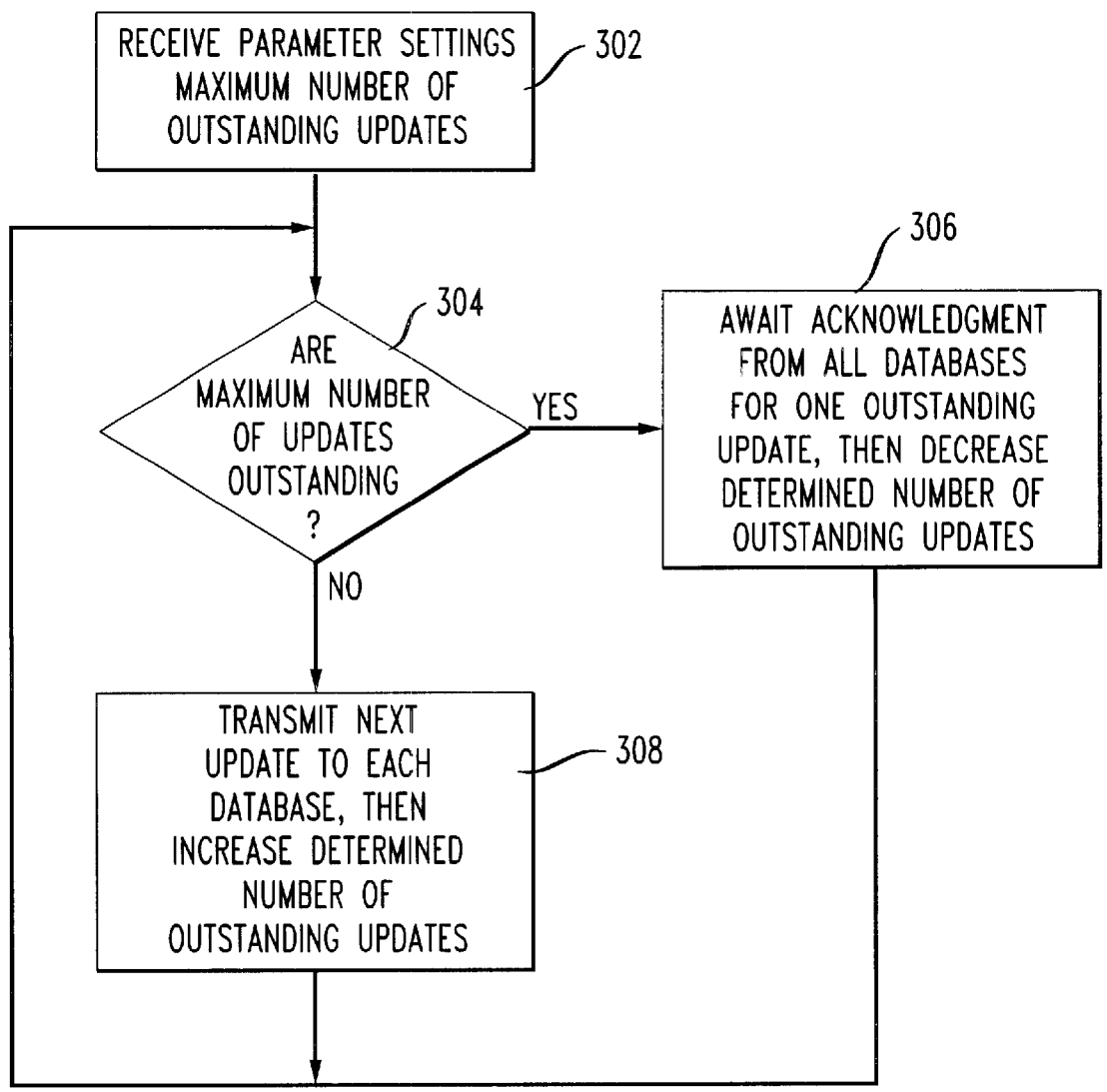

METHOD AND APPARATUS FOR SYNCHRONIZING THE PROVISION OF DATA AMONG GEOGRAPHICALLY DISTRIBUTED DATABASES

CROSS REFERENCES TO RELATED APPLICATIONS

This application claims the benefit of U.S. provisional application number 60/114,566 filed Dec. 31, 1998, entitled "Method and Apparatus for Synchronizing the Provision of Data Among Geographically Distributed Databases."

BACKGROUND

The present invention relates to updating geographically distributed databases. More particularly, the present invention relates to a method and apparatus for synchronizing the provision of data updates to geographically distributed databases.

A database may be used to store records or files of information such as telephone numbers or bank account numbers. Database files are organized so they may be easily accessed or updated. Many different types of network services are enabled by querying a database to obtain information from within the database's files. For example, a switch within the public switched telephone network (PSTN) may query a database for information on how to process an incoming telephone call.

Many modern network service providers are challenged with providing one or more services to a large number of users who are widely distributed within a geographic region. For example, a single telecommunications company may provide telephony services to users throughout the entire United States. One method for providing network or other similar type services to users within a particular geographic region entails enabling users to access a single database from anywhere within the geographic region. Unfortunately, a single database arrangement suffers from a number of drawbacks which hinder the provision of services. For example, the service provider may be unable to provide services to any users if the single database experiences a software or mechanical failure. Additionally, a single database can only simultaneously process a limited number of user queries. Once the limited capacity of the database is exceeded, user queries may need to be queued pending the availability of required database processing resources. Large queuing delays may slow the provision of services to the users.

To remedy some of the drawbacks of a single database arrangement, many service providers store the same files of information on many different geographically distributed databases and connect each database to a central database and/or a general purpose computer within a central update center. Users throughout the geographic region can then obtain the same information or services from the same service provider by sending queries to the nearest available database. FIG. 1 illustrates a typical distributed database network. The distributed database network of FIG. 1 comprises an update center 102 adapted for two-way communication with each distributed database 104. Update center 102 may comprise a general purpose computer. This general purpose computer typically consists of a processor adapted to be connected to a segment of computer readable memory. The computer readable memory stores computer program code segments (database management software) which, when executed by the processor, implement steps to update one or more distributed databases.

Each distributed database 104 is typically connected to a general purpose computer which includes a processor adapted to be connected to a segment of computer readable memory. Each of these segments of computer readable memory store computer program code segments (update processing software) which, when executed by their respective processors, process data updates received from update center 102. These processing steps entail modifying their respective databases in accordance with the instructions/data included within the data updates received from update center 102. Data updates and acknowledgment messages are exchanged between database management software on the central database 102 general purpose computer and data update processing software on the general purpose computer of each distributed database 104 by encapsulating appropriate instructions/data within packets in accordance with a protocol (such as transmission control protocol/Internet protocol (TCP/IP)) and sending these packets to the appropriate destination.

For example, when one or more files stored within each distributed database requires modification, the service provider can use a keyboard attached to the update center 102 general purpose computer to enter the desired modifications in response to prompts generated by the database management software. Once the modifications are entered, the service provider can then execute the changes by instructing the database management software to encapsulate the modification instructions/data into update packets and send the data update packets to the update processing software on each distributed database 104 general purpose computer. The update processing software then processes each received data update packet by making the appropriate changes within its respective connected database. After a data update has been processed, the data update processing software activates the data update and then sends a packet including an acknowledgment message to the central database 102 database management software.

Unfortunately, due to unequal processor speeds and the randomness in processing time (e.g., due to resource contention), the rate at which each data update is processed at each database may differ. Thus, at any one period in time within the same network, different geographically distributed databases may include different data. If one database activates a data update and makes the updated data available to users prior to another database activating the same data update, a user who queries the first database and another user who queries the other database for the same information at the same time may receive different information or services. To avoid this possibility, it is advantageous for the service provider to synchronize the updating process so each geographically distributed database activates the same data update at substantially the same time.

In view of the above, it can be appreciated that there is a need for a method and apparatus which synchronizes the provision of data updates to distributed databases.

SUMMARY OF THE INVENTION

One embodiment of the present invention provides a method for synchronizing the provision of data updates to a plurality of databases. In accordance with an embodiment of the present invention, known database management software executed by a general purpose computer connected to each of the plurality of distributed databases is modified to include the ability to limit the number of data updates which may be outstanding to the plurality of distributed databases during any particular period of time. After receiving a user determined integer value representing a maximum number of outstanding data updates, the software determines an integer value representing the current number of outstanding data updates. A data update is outstanding when the data update has been sent (for example, from an update center) to each of the plurality of databases and an acknowledgment message corresponding to that data update has not been received from each of the plurality of databases. Next, the software compares the maximum number of outstanding data updates to the determined current number of outstanding data updates. If the current number is less than the received maximum number, the software transmits the next data update to each of the plurality of databases and increases the determined current number of outstanding data updates by one integer value. If the current number of outstanding data updates is greater than the maximum number of outstanding data updates, the software waits to receive an acknowledgment message corresponding to one of the outstanding data updates from each of the plurality of databases. Upon receiving an acknowledgment message (corresponding to one of the outstanding data updates) from each of the plurality of databases, the software decreases the determined current number of outstanding data updates by one integer value. After either transmitting a next data update or receiving the appropriate number of acknowledgment messages corresponding to an outstanding data update, the above described steps are repeated beginning with the step of determining the current number of outstanding data updates.

BRIEF DESCRIPTION OF THE DRAWINGS

FIG. 3 illustrates a flow chart with steps for synchronizing the provision of data updates in accordance with an embodiment of the present invention.

DETAILED DESCRIPTION

The present invention synchronizes the process of updating a plurality of distributed databases by limiting the number of data updates which may be outstanding to the plurality of distributed databases during any particular period of time. As used herein, a data update is outstanding when the data update has been sent (for example, from an update center) to each of the plurality of databases and an acknowledgment message corresponding to that data update has not been received from each of the plurality of databases.

Figure 2:
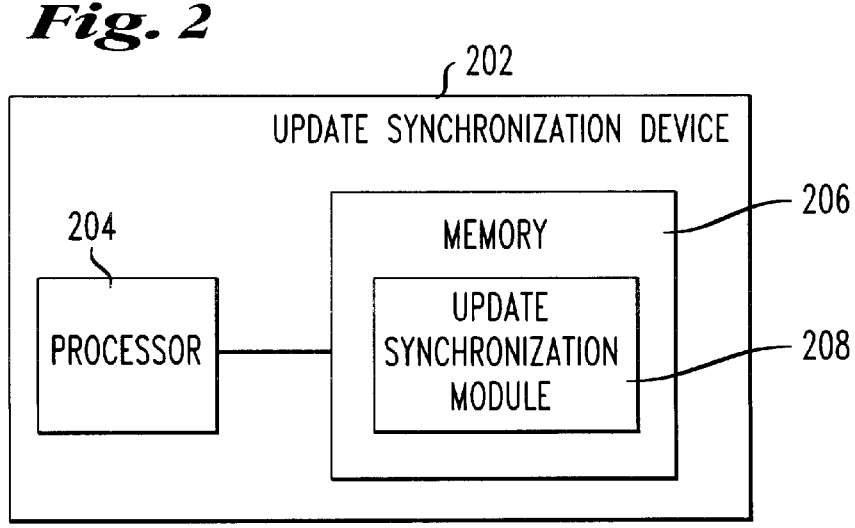
FIG. 2 is a block diagram of an update synchronization device in accordance with an embodiment of the present invention.

FIG. 2 is a block diagram of an apparatus suitable for practicing an embodiment of the present invention. In FIG. 2, an update synchronization device 202 comprises a processor 204 adapted to be connected to a computer readable memory 206. Computer readable memory 206 stores computer program code segments which, when executed by processor 204, implement the main functionality for this embodiment of the invention. These computer program code segments are included within an update synchronization module 208. Although in this embodiment of the invention the computer program code segments are shown in one module, it should be appreciated that this module can be further separated into more modules and still fall within the scope of the invention.

Figure 1:
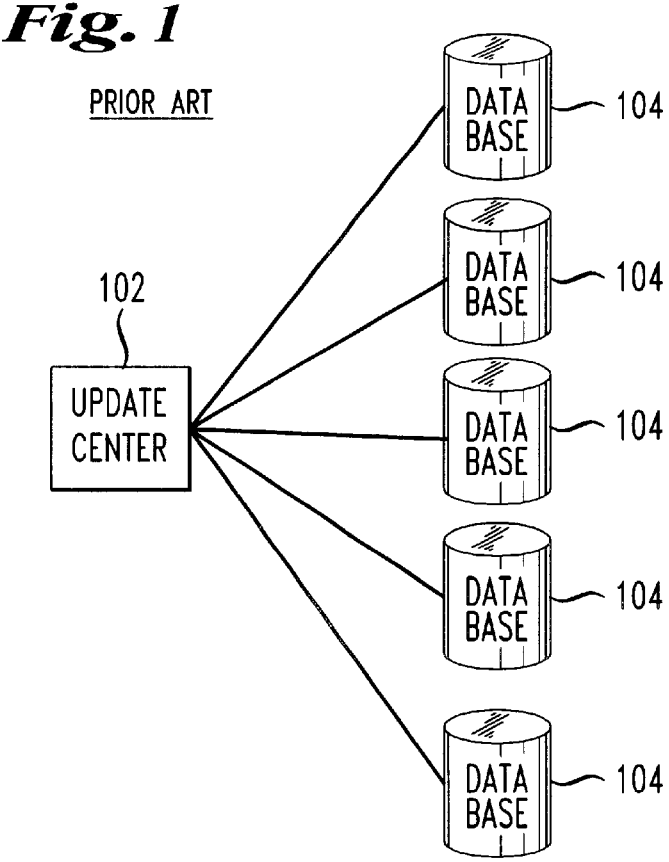
FIG. 1 is a block diagram of a system suitable for practicing an embodiment of the present invention.

The apparatus of FIG. 2 may be adapted to be included within an update center such as the update center described above with reference to FIG. 1. Alternatively, because known central databases within networks such as those described above with reference to FIG. 1 typically include a general purpose computer which executes database management software, the embodiment of FIG. 2 may be obtained by modifying this existing database management software to include a module such as update synchronization module 208. The operation of this module will be explained below with reference to FIGS. 1–3.

FIG. 3 illustrates a flow chart with steps for synchronizing the process of updating a plurality of distributed databases in accordance with an embodiment of the present invention. The steps within the flow chart of FIG. 3 may be implemented as computer program code segments in any known programming language, such as C++. More specifically, the steps of FIG. 3 may be implemented as computer program code segments stored within a module such as update synchronization module 208.

To illustrate the method of the present invention, assume database management software executed by a general purpose computer within an update center (as described above with reference to FIG. 1) has been modified to include a module such as update synchronization module 208 which includes computer program code segments representing the steps illustrated in the flow chart of FIG. 3. To begin the process of synchronizing the contents of each distributed database 104, the service provider uses an input device (for example, a keyboard attached to the update center 102 general purpose computer) to send the modified database management software an integer value representing the maximum number of outstanding data updates. In step 302 of FIG. 3, the modified database management software receives a parameter representing this integer value. In step 304, the software determines an integer value representing the current number of outstanding data updates and compares this current number of outstanding data updates to the received maximum number of outstanding data updates to determine whether the current number of outstanding data updates equals or exceeds the received maximum number of outstanding data updates. If the answer to the query in step 304 is "yes," the software proceeds to step 306 and waits to receive an acknowledgment message corresponding to one of the outstanding data updates from each of the distributed databases 104. Once an acknowledgment message corresponding to one of the outstanding data updates is received from each of the distributed databases 104, the software reduces the determined number of outstanding data updates by one integer value and returns to step 304.

If the answer to the query in step 304 is "no," the software proceeds to step 308 and transmits the next data update to each of the distributed databases 104. After transmitting the next data update to each of the distributed databases 104, the software increases the determined number of outstanding data updates by one integer value and returns to step 304. The software then repeats the steps of FIG. 3 as necessary.

As a result of performing the steps illustrated within the flow chart of FIG. 3, each of databases 104 is more likely to include the same data at any one period in time. A database which is updated using a processor faster than the processors of other databases is prevented from completing more than a predetermined number of data updates before the other databases. Thus, a first user who queries a first database and a second user who queries a second database at approximately the same time are both likely to received the same information or services from their respective databases.

Although several embodiments are specifically illustrated herein, it will be appreciated that modifications and variations of the present invention are covered by the above teachings and within the purview of the appended claims without departing from the spirit and intended scope of the invention. For example, in another embodiment, the general purpose computer which executes computer program code segments in accordance with the present invention may be connected to a central database.

What Is claimed Is:

1. A method for synchronizing the provision of data updates to a plurality of databases, comprising the steps of:

providing, at an update center, a first integer value, said first integer value indicating a maximum number of outstanding data updates;

determining, at said update center, a number of data updates currently outstanding, wherein said determined number of outstanding data updates is a second integer value;

comparing said maximum number of outstanding data updates to said determined number of currently outstanding data updates;

sending, from said update center to each of the plurality of databases, a data update if said determined number of currently outstanding data updates is less than said maximum number of outstanding data updates;

increasing said determined number of outstanding data updates by one integer value upon sending said data update;

receiving, at each of said plurality of databases, said data update;

updating each of the plurality of databases using said received data update;

sending, from one of the plurality of databases to said update center, an acknowledgment message after using a previously received data update to update said database, wherein said acknowledgment message is identified as corresponding to a particular data update;

repeating said acknowledgment sending step at each of the plurality of databases; and decreasing said determined number of outstanding data updates by one integer value upon receiving a group of acknowledgment messages from the plurality of databases, wherein said group of acknowledgment messages includes one acknowledgment message corresponding to a same outstanding data update from each of the plurality of databases.

2. A method for synchronizing the provision of data updates to a plurality of databases, comprising the steps of:

providing a first integer value, said first integer value indicating a maximum number of outstanding data updates;

determining a number of data updates currently outstanding, wherein said determined number of outstanding data updates is a second integer value;

comparing said maximum number of outstanding data updates to said determined number of currently outstanding data updates;

sending a new data update to each of the plurality of databases if said determined number of currently outstanding data updates is less than said maximum number of outstanding data updates;

increasing said determined number of outstanding data updates by one integer value upon sending said new data update;

receiving an update acknowledgment message from each of the plurality of databases, wherein each of said received update acknowledgment messages corresponds to a same outstanding data update; and reducing said determined number of outstanding data updates by one integer value upon receiving said update acknowledgment messages.

3. A computer-readable medium whose contents cause a computer system to synchronize the process of updating a plurality of distributed databases, by performing the steps of:

providing a first integer value, said first integer value indicating a maximum number of outstanding data updates, wherein a data update is outstanding when said data update has been sent to each of said plurality of databases and an update acknowledgment corresponding to said data update has not been received from each of said plurality of databases;

determining a number of data updates currently outstanding, wherein said determined number of outstanding data updates is a second integer value;

comparing said maximum number of outstanding data updates to said determined number of currently outstanding data updates;

sending a new data update to each of the plurality of databases if said determined number of currently outstanding data updates is less than said maximum number of outstanding data updates;

increasing said determined number of outstanding data updates by one integer value upon sending said new data update;

receiving an update acknowledgment message from each of the plurality of databases, wherein each of said received update acknowledgment messages corresponds to a same outstanding data update; and reducing said determined number of outstanding data updates by one integer value upon receiving said update acknowledgment messages.

4. An apparatus for synchronizing the provision of data updates to a plurality of databases, comprising:

a processor;

a computer readable memory segment adapted to be connected to said processor;

an update synchronization module within said computer readable memory, said update synchronization module including computer program code segments which, when executed by said processor, implement the steps of:

providing a first integer value, said first integer value indicating a maximum number of outstanding data updates, wherein a data update is outstanding when said data update has been sent to each of said plurality of databases and an update acknowledgment corresponding to said data update has not been received from each of said plurality of databases;

determining a number of data updates currently outstanding, wherein said determined number of outstanding data updates is a second integer value;

comparing said maximum number of outstanding data updates to said determined number of currently outstanding data updates;

sending a new data update to each of the plurality of databases if said determined number of currently outstanding data updates is less than said maximum number of outstanding data updates;

increasing said determined number of outstanding data updates by one integer value upon sending said new data update;

receiving an update acknowledgment from each of the plurality of databases, wherein each of said received update acknowledgment messages corresponds to a same outstanding data update; and reducing said determined number of outstanding data updates by one integer value upon receiving said update acknowledgment messages.

* * * * *